US012679409B2

(12) United States Patent
Bagschik et al.

(10) Patent No.: US 12,679,409 B2
(45) Date of Patent: Jul. 14, 2026

(54) PARAMETER SPACE OPTIMIZATION

(71) Applicant: Zoox, Inc., Foster City, CA (US)

(72) Inventors: Gerrit Bagschik, Foster City, CA (US); Andraz Kavalar, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 494 days.

(21) Appl. No.: 17/332,745

(22) Filed: May 27, 2021

(65) Prior Publication Data

US 2022/0379919 A1 Dec. 1, 2022

(51) Int. Cl.
B60W 60/00 (2020.01)
G05B 13/02 (2006.01)

(52) U.S. Cl.
CPC ..... B60W 60/0015 (2020.02); G05B 13/0275 (2013.01); B60W 2520/10 (2013.01); B60W 2552/00 (2020.02); B60W 2554/80 (2020.02)

(58) Field of Classification Search
CPC ............. B60W 60/00; B60W 2552/00; B60W 2554/00; B60W 2520/00; G05B 13/00
See application file for complete search history.

(56) References Cited

U.S. PATENT DOCUMENTS

| | | | | |
|---|---|---|---|---|
| 9,108,582 | B1 * | 8/2015 | Kozloski | G06F 30/15 |
| 11,267,482 | B2 * | 3/2022 | Monteil | A61B 5/389 |
| 2016/0321381 | A1 * | 11/2016 | English | G06F 30/20 |
| 2017/0076607 | A1 * | 3/2017 | Linder | G08G 1/167 |
| 2019/0072968 | A1 * | 3/2019 | Will, IV | G08G 1/0129 |
| 2020/0130709 | A1 * | 4/2020 | Rodionova | G05B 13/042 |
| 2020/0394278 | A1 * | 12/2020 | Varon-Weinryb | G06F 17/18 |
| 2021/0046954 | A1 * | 2/2021 | Haynes | G06N 7/01 |
| 2021/0097148 | A1 | 4/2021 | Bagschik | |
| 2022/0067550 | A1 * | 3/2022 | DeLaus | G06N 7/01 |
| 2022/0073102 | A1 * | 3/2022 | Stenneth | G08G 1/096741 |
| 2022/0097728 | A1 * | 3/2022 | Lin | G06N 20/00 |

(Continued)

FOREIGN PATENT DOCUMENTS

| | | |
|---|---|---|
| EP | 3690745 A1 | 8/2020 |
| KR | 20170057084 A | 5/2017 |
| WO | WO2020188562 A1 | 9/2020 |

OTHER PUBLICATIONS

Sha et al., "Applying Bayesian Optimization for Calibration of Transportation Simulation Models", Oct. 2020, Transportation Research Record, vol. 2674, Issue 10, pp. 215-228 (Year: 2020).*

(Continued)

*Primary Examiner* — Aniss Chad
*Assistant Examiner* — Elizabeth J Slowik
(74) *Attorney, Agent, or Firm* — Lee & Hayes, P.C.

(57) ABSTRACT

Techniques for analyzing a parameter space are discussed. Techniques may include receiving policy data for evaluating a vehicle controller. The techniques may further include determining, using a Bayesian optimization and based at least in part on the vehicle controller, parameter sets associated with adverse events. The adverse events may be associated with a violation of the policy data. The techniques may associate, based on exposure data, parameter bounds of the adverse events and probabilities of the adverse events in a driving environment. A safety metric may be determined based on the Bayesian optimization. The techniques may also include weighting an impact of an adverse event based on the safety metric.

20 Claims, 6 Drawing Sheets

100

(56)　　　　　References Cited

U.S. PATENT DOCUMENTS

| | | | | |
|---|---|---|---|---|
| 2022/0172087 A1* | 6/2022 | Guzik | ................... | G06N 20/00 |
| 2022/0197280 A1* | 6/2022 | Venkatadri | ............ | B60W 50/00 |
| 2022/0324464 A1* | 10/2022 | Collin | ..................... | G06N 7/01 |

OTHER PUBLICATIONS

Ghosh et al., "Verifying Controllers Against Adversarial Examples with Bayesian Optimization", May 2018, IEEE International Conference on Robotics and Automation (Year: 2018).*
Probability, Nov. 26, 2020, Merriam-Webster (Year: 2020).*
Gangopadhyay, et al, "Identification of Test Cases for Automated Driving Systems Using Bayesian", 2019 IEEE Intelligent Transportation Systems Conference, Oct. 27-30, 2019, pp. 1961-1967.
U.S. Appl. No. 16/457,679, OMalley, filed Jun. 28, 2019, titled "Synthetic Scenario Generator Based on Attributes", 65 pgs.
U.S. Appl. No. 16/866,715, Bagschik et al., filed May 5, 2020, titled System for Generating Generalized Simulation Scenarios, 39 pgs.
PCT Search Report and Written Opinion mailed Aug. 31, 2022 for PCT Application No. PCT/US22/29774, 11 pages.

* cited by examiner

200

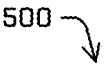

500

DETERMINE A JOB TO BE EXECUTED
502

DETERMINE ONE OR MORE BAYESIAN OPTIMIZATION
CONFIGURATION FILES ASSOCIATED WITH THE JOB
504

DETERMINE ONE OR MORE COMPUTING DEVICES TO
EXECUTE THE JOB
506

DETERMINE MULTIPLE PROCESSES TO PERFORM TASKS
ASSOCIATED WITH THE JOB
508

ASSIGN EACH OF THE MULTIPLE PROCESSES TO A
PARTICULAR COMPUTING DEVICE
510

RECEIVE RESULTS FROM ONE OR MORE OF THE MULTIPLE
PROCESSES AND STORE THE RESULTS IN A RESULTS
DATABASE
512

MORE JOBS TO EXECUTE?
514

No

Yes

DETERMINE A NEXT JOB TO EXECUTE
518

END
516

FIG. 5

PARAMETER SPACE OPTIMIZATION

BACKGROUND

An autonomous driving system may be trained and/or validated by operating or simulating the autonomous driving system in multiple driving situations and environments. The accuracy and performance of the autonomous driving system can be analyzed in each driving situation and the system may be modified, as needed, based on the analysis. To fully test an autonomous driving system, it may be desirable to operate or simulate the autonomous driving system in a large number of different situations and environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 illustrates an example process for executing multiple jobs on multiple computing devices to implement Bayesian optimization techniques, in accordance with examples of the disclosure.

DETAILED DESCRIPTION

Figure 1:
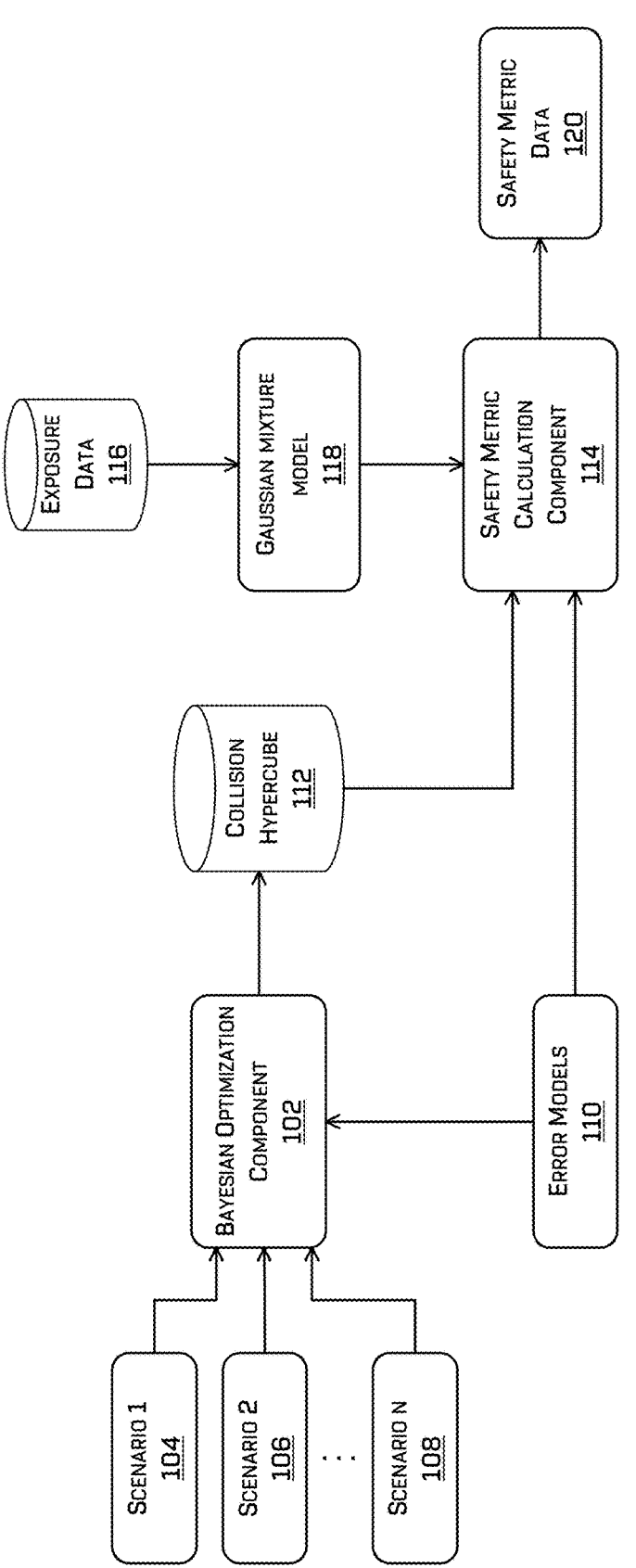
FIG. 1 is a schematic diagram illustrating an example implementation using Bayesian optimization to generate a parameter space with a high likelihood of adverse events, in accordance with examples of the disclosure.

This disclosure is directed to techniques (including Bayesian optimization techniques) that are capable of generating a parameter space with a high likelihood of particular types of events. These events may include adverse events, policy violations, and other events of interest. For example, the techniques may generate a parameter space with a high likelihood of adverse events (i.e., events which have a negative impact on the safe operation of the system) in an environment associated with a vehicle, such as an autonomous vehicle. In some examples, the adverse events may include collisions, near-collisions, and the like that occur during operation of a vehicle in an environment. In general, the occurrence of such particular events (e.g., adverse events) may by relatively small (and in some cases, extremely small) given a particular parameter space, despite having an extremely high importance to determine whether the system is able to operate safely. As such, the techniques described in detail herein define systems and methods for ensuring the identification of infrequent, but critical vehicle situations and events. These vehicle situations, such as adverse events, policy violations, and other events of interest can be difficult and time-consuming to identify using traditional simulation procedures due to the rare occurrence of the particular vehicle situations. These situations are valuable for simulating and testing vehicles and vehicle systems. In some examples, an adverse event includes an event in which executing a vehicle controller results in a violation of the policy data.

The Bayesian optimization techniques described herein may evaluate multiple points in a parameter space in a way that quickly finds optimal values. For example, the Bayesian optimization techniques may identify scenarios where a distance between an object and a vehicle is minimized, which may result in an increased number of collisions or near-collisions.

In some examples, the techniques described herein may determine a simulation scenario. The techniques may determine, using a Bayesian acquisition function, a set of parameters that represent the simulation scenario. The set of parameters may include a minimum value and a maximum value. Based on the set of parameters, the techniques may evaluate an autonomous vehicle simulator to determine a simulation result. Based on the simulation result, the techniques may determine a safety metric associated with an autonomous vehicle controller.

In some examples, a computing system may determine a simulation scenario based on an exposure model and determines an initial Bayesian acquisition function. Using the Bayesian acquisition function, the computing system may determine a set of parameters representing the simulation scenario. The set of parameters may be evaluated by an autonomous vehicle simulator to determine a simulation result. Based on the simulation result, the computing system may determine a safety metric associated with an autonomous vehicle controller. The computing system may determine whether a parameter space has converged on a high likelihood of adverse events. If the parameter space has converged, the process ends. If the parameter space has not converged, the computing system may determine, based on the simulation result and the safety metric, a revised set of parameters representing the simulation scenario. The process is then repeated using the revised set of parameters. In some examples, the parameters may include a number of objects in an environment, a type of an object in an environment, a type of intersection, a vehicle speed, a distance from the vehicle to an additional object, and a speed of the additional object.

In some examples, a system may determine a job to be executed and determine one or more Bayesian optimization configuration files associated with the job. The system may also determine one or more computing devices to execute the job and determine multiple processes to perform tasks associated with the job. The system may assign each of the processes to a particular computing device. Upon execution, the system may receive results from one or more of the multiple processes and stores the results in a results database. The system may determine whether additional jobs remain to be executed. If all jobs have been executed, the process ends. If additional jobs require execution, the system may determine a next job to execute and repeat the process for the next job.

In particular examples, some traditional simulation procedures use random input data to seed a simulation. Since the random input data may include a very high percentage of "typical events" that are not adverse events, it may take a significant number of simulations to identify a single adverse event. By using Bayesian optimization techniques, the described systems and methods can identify adverse events faster and with significantly less computational resources than many traditional simulation techniques. In some examples, the Bayesian optimization techniques may represent orders of magnitude of improvement. Additionally, the Bayesian optimization techniques described herein may operate without requiring random sampling techniques. In some examples, these identified vehicle situations may be useful for testing, simulating, and training an autonomous driving system, such as an autonomous vehicle control system.

The techniques described herein can be implemented in a number of ways. Example implementations are provided below with reference to the following figures. Although discussed in the context of an autonomous vehicle, the methods, apparatuses, and systems described herein can be applied to a variety of systems and are not limited to autonomous vehicles. In another example, the techniques can be utilized in any type of vehicle, robotic system, or any system using data of the types described herein. Further, the methods, apparatuses, and systems described herein can be applied to any simulation framework and is not limited to simulating autonomous vehicle. Additionally, the techniques described herein can be used with real data (e.g., captured using sensor(s)), simulated data (e.g., generated by a simulator), or any combination of the two.

As discussed herein, techniques described may be used to generate a parameter space with a high likelihood of adverse events. These adverse events may include collisions, near-collisions, and the like associated with an autonomous vehicle operating in a particular environment. For example, the systems and methods described herein may strategically evaluate points in a parameter space in a way that quickly finds optimal values. In some examples, the systems and methods may look for scenarios where a distance between an object and a vehicle is minimized. Minimizing the distance between an object and a vehicle may support identification of collision (or near-collision) situations that might otherwise be difficult to simulate because of their low probability and low frequency of occurrence. For example, particular vehicle situations may require 10,000 or more simulations to identify a single situation that represents a potential adverse event. Executing high numbers of simulations requires significant time and computing resources to implement.

Thus, the Bayesian optimization techniques discussed herein can assist with the identification of infrequent, but critical, vehicle situations. In some examples, the systems and methods may look for scenarios that optimize metrics associated with a riskiness of a scenario that do not include the distance between an object and a vehicle. Although particular examples discussed herein may refer to adverse events, the described systems and methods may be used with any type of event, policy violation, or other events of interest. Example policies (also referred to as policy functions) may include various safe operation factors, such as no collisions, maintaining a safe driving distance from other vehicles and objects, maintaining a safe speed, identifying all objects, staying within the driving lane, staying within roadway speed limits, and the like.

FIG. 1 is a schematic diagram illustrating an example implementation 100 using Bayesian optimization to generate a parameter space with a high likelihood of adverse events, in accordance with examples of the disclosure. The example of FIG. 1 provides a pipeline that implements Bayesian optimization techniques to optimize "black box"

functions. In some examples, the implementation 100 identifies a parameter space associated with collisions, near-collisions, and other adverse events without having to provide any data regarding the occurrence rate of the events. Instead, use of the implementation 100 will identify adverse events for use in testing and training an autonomous driving systems.

As shown in FIG. 1, example implementation 100 may include a Bayesian optimization component 102 coupled to multiple scenarios 104, 106, and 108. The Bayesian optimization component 102 performs, for example, the parameter space optimization techniques discussed herein. In some examples, the Bayesian optimization approach may replace existing random sampling techniques. As discussed herein, Bayesian optimization component 102 may optimize and find adverse event cases using various Bayesian optimization techniques.

The multiple scenarios 104-108 may represent, for example, vehicle scenario types that are being analyzed to optimize the parameter space and identify adverse events. In some examples, the multiple scenarios 104-108 may include, jaywalking pedestrians (e.g., pedestrians crossing a road at an unauthorized location), vehicles traveling close to one another, emergency vehicles crossing a road, and the like. Any type of scenario can be optimized using the systems and methods described herein.

One or more error models 110 may be communicated to Bayesian optimization component 102. In some examples, the error models 110 may be used by Bayesian optimization component 102 when exploring a particular parameter space. For example, the error models 110 may provide additional parameters, such as position error information, localization error information, and the like. In some examples, the same error model parameters may be applied to multiple scenarios (e.g., scenarios 104-108). In some examples, the error models 110 may be generated at least in part by an administrator, a testing engineer, or other users. In particular examples, the error models 110 may define the boundaries of a permissible error and may define how the errors are distributed between the boundaries.

In the example of FIG. 1, the Bayesian optimization component 102 outputs a collision hypercube 112. In some examples, the collision hypercube 112 stores data, such as parameter value ranges, associated with results where a collision or other adverse event was identified. Thus, when the Bayesian optimization component 102 identifies an adverse event, data related to the adverse event is communicated from the Bayesian optimization component 102 to the collision hypercube 112.

A safety metric calculation component 114 may receive data from the error models 110, the collision hypercube 112, and a Gaussian mixture model 118. Additionally, Gaussian mixture model 118 may receive information from exposure data 116. In some examples, exposure data 116 may be actual data collected by vehicles or other systems while driving in actual operating environments, such as data logged by vehicles as they drive through different real-world situations (e.g., following another vehicle). In some examples, Gaussian mixture model 118 may include the distribution of the exposure data (e.g., a mean distance to another vehicle and a mean speed driven).

In some examples, the safety metric calculation component 114 may determine the likelihood of a particular adverse event, such as an adverse event identified by the Bayesian optimization component 102.

In some examples, the safety metric calculation component 114 generates safety metric data 120. Various systems and methods may use the safety metric data 120 to test and train vehicle systems, such as testing, training, or simulating autonomous driving systems. In some examples, safety metric data 120 may be referred to as a safety performance indicator. In some examples, the systems and methods described herein weight an impact of an adverse event based on the safety metric data 120. Additionally, in some examples, the systems and methods determine whether the safety metric data 120 exceeds a threshold value for use in an autonomous vehicle. The Bayesian optimization is validated for use in an autonomous vehicle if the safety metric data 120 exceeds the threshold.

In some examples, the safety metric calculation component 114 may use one or more of information from the collision hypercube 112, the exposure data 116, and the gaussian mixture model 118 to determine a ratio of events within collision hypercube 112 versus events outside of collision hypercube 112. In some examples, the safety metric calculation component 114 may determine a number of miles between events. Based on the calculated ratio of events and the number of miles between events, the safety metric calculation component 114 may calculate the safety metric data 120. In some examples, the safety metric calculation component 114 determines a probability (or likelihood) of the occurrence of particular events.

As discussed in greater detail herein, the Bayesian optimization component 102 may receive one or more parameters, which may include parameter minimum and maximum values. Example parameters may include vehicle speed, vehicle distance from an object, and the like. The Bayesian optimization component 102 simulates one sample and calculates metrics associated to that simulated sample. Based on the results of the first simulated sample and the calculated metrics, the Bayesian optimization component 102 determines where to search next within a parameter space. In some examples, the Bayesian optimization component 102 explores different areas within a parameter space to identify areas with increased adverse events, as discussed herein. The areas within the parameter space with these increased adverse events are recorded and further evaluated with different sets of parameters. During the iteration process, the Bayesian optimization component 102 may perform an optimization, such as a Bayesian optimization, which may result in learning and identifying sets of parameters that are likely to produce adverse events. Although Bayesian optimization techniques are discussed herein, other types of optimization techniques may be used with the systems and methods described herein.

This iterative process is repeated by the Bayesian optimization component 102 until one or more regions are discovered within the parameter space where a significant number of adverse events occur. These discovered regions are used to quickly discover more adverse events for use in testing, training, or simulating autonomous driving systems. As discussed herein, the example implementation 100 may quickly identify regions where adverse events occur frequently. Additionally, these regions may be identified with significantly less computational resources than existing simulation techniques.

In some examples, Bayesian optimization component 102 may identify one or more parameters associated with adverse event situations. The safety metric calculation component 114 may then determine a probability of an adverse event occurring.

As discussed herein, a Gaussian mixture model may be used for modeling various probabilities. In other examples, any type of model can be used to model probabilities, such as a deep learning probability model and the like.

Figure 2:
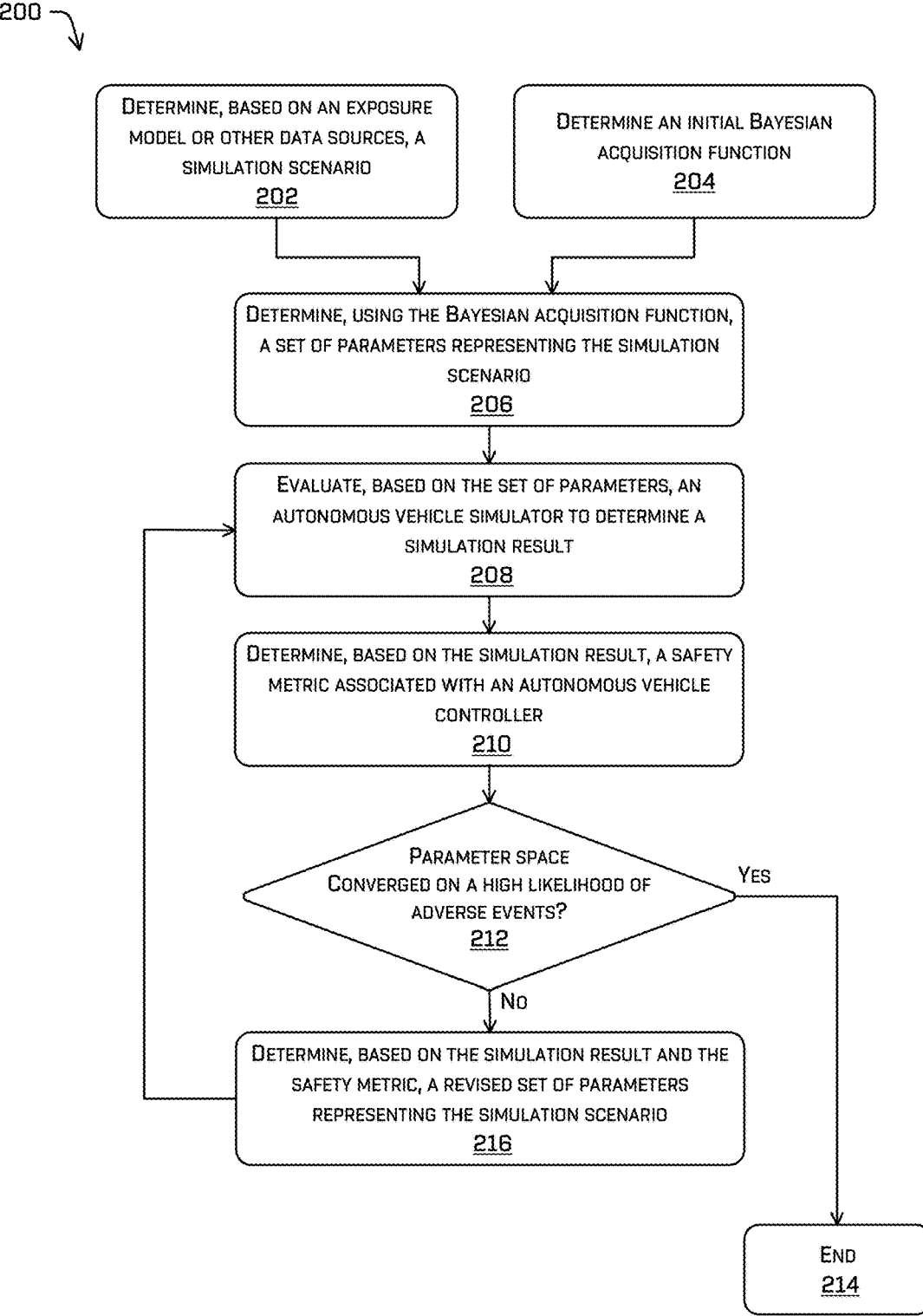
FIG. 2 illustrates an example process for determining a parameter space with a high likelihood of adverse events for training an autonomous driving system, in accordance with examples of the disclosure.

FIG. 2 illustrates an example process 200 for determining a parameter space with a high likelihood of adverse events for training an autonomous driving system, in accordance with examples of the disclosure. The operations described herein with respect to the process 200 may be performed by various components and systems, such as the components illustrated in FIGS. 1 and 4.

By way of example, the process 200 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 200. In some examples, multiple branches represent alternate implementations that may be used separately or in combination with other operations discussed herein.

At operation 202, the process may include determining, based on an exposure model and/or other data sources, a simulation scenario. For example, the simulation scenario may be determined using actual vehicle data, simulated vehicle data, environmental data, and any other type of data. Examples of exposure models and simulation scenarios are provided in U.S. patent application Ser. No. 16/866,715, titled "Systems for Generating Generalized Simulation Scenarios," filed May 5, 2020, the entirety of which is herein incorporated by reference for all purposes.

Examples of determining a simulation scenario are provided in U.S. patent application Ser. No. 16/457,679, titled "Synthetic Scenario Generation Based on Attributes," filed Jun. 28, 2019, the entirety of which is herein incorporated by reference for all purposes.

At operation 204, the process may include determining an initial Bayesian acquisition function. As discussed below, process 200 may use one or more Bayesian acquisition functions to optimize a parameter space.

At operation 206, the process may include determining, using the initial Bayesian acquisition function, a set of parameters representing the simulation scenario. In some examples, an initial set of parameters may be determined randomly within the parameter space. In other examples, the initial set of parameters can be determined by a system or user based on existing knowledge of the parameter space or other information. In some examples, the parameters may be determined by a user and the parameter values may be determined by an algorithm.

At operation 208, the process may include evaluating, based on the set of parameters, an autonomous vehicle simulator to determine a simulation result. In some examples, this simulation result may indicate the presence or absence of an adverse event. This indication of the presence or absence of an adverse event is recorded for future reference and used to select subsequent sets of parameters. In some examples, a user may select a particular safety metric as the focus for each processing activity.

At operation 210, the process may include determining, based on the simulation result, a safety metric associated with an autonomous vehicle controller.

At operation 212, the process may determine whether a parameter space has converged on a high likelihood of adverse events. As discussed herein, convergence may be a simulation budget, such as a number of iterations to perform based on a user's experience and previous simulation results. For example, a user may determine that 500 iterations are enough to find regions of interest within a particular environment. The number of iterations may be based on the complexity of the simulation. For example, if the systems and methods are simulating a complex roadway intersection, more iterations may be needed to find the regions of interest. Similarly, if the systems and methods are simulating a simple activity of following another vehicle, fewer iterations may be needed to find the regions of interest. In some examples, the number of iterations may be determined based on a number of identified events. For example, a process may continue iterating until 10 events are identified. If no events are identified within a particular number of iterations (e.g., 500), the process may stop.

As discussed herein, the simulation budget for a particular process may include a first number of iterations for exploration (e.g., 150 iterations) and a second number of iterations for optimization of the function (e.g., 350 iterations).

If the parameter space has converged at operation 212, the process ends at 214 having identified a parameter space with a high likelihood of adverse events. If the parameter space has not converged at operation 212, the process continues to operation 216. In some examples, a parameter space is determined to have converged if a particular number of iterations have been completed, a particular metric is achieved, a difference in metrics between consecutive iterations is below a threshold, a rate of change of a metric is below a threshold, and the like.

At operation 216, the process may include determining, based on the simulation result (determined at 208) and the safety metric (determined at 210), a revised set of parameters representing the simulation scenario. The process returns to operation 208 to evaluate the revised set of parameters.

In some examples, the process 200 begins by applying a first Bayesian acquisition function to multiple sets of parameters. For example, the first Bayesian acquisition function may be used for a particular period of time or a particular number of iterations. In some examples, the first Bayesian acquisition function is used to explore the parameter space to see, for example, which sets of parameters within the parameter space are associated with adverse events. In some examples, the first Bayesian acquisition function may not be concerned with optimization of the parameter space and, instead, is focused on mapping the parameter space.

After the first Bayesian acquisition function is used for a period of time or a number of iterations, process 200 may continue by using a second Bayesian acquisition function that initially uses the data generated by the first Bayesian acquisition function. The second Bayesian acquisition function is used to optimize the regions within the parameter space that are associated with adverse events. The second Bayesian acquisition function uses the evaluations performed on the sets of parameters by the first Bayesian acquisition function to narrow down the regions within the parameter space that are most likely to produce adverse events. The second Bayesian acquisition function performs multiple iterations to test the areas that are likely to contain adverse events. As discussed herein, the second Bayesian acquisition function may perform multiple iterations in parallel by 1) running multiple iterations (e.g., jobs) sequentially without communication between the jobs, or 2) running multiple iterations simultaneously and allowing the multiple iterations to communicate with each other during processing. As discussed herein, this approach can reduce the time and computational resources needed to identify adverse event situations that are useful in testing, training, or simulating autonomous driving systems.

In some examples, the process 200 may further consider results from previous scenario processing. In these examples, the process 200 may use both 1) results from previous scenario processing and 2) results from the first Bayesian acquisition function used to explore the parameter space. The second Bayesian acquisition function may use both the results from the previous scenario processing and the results from the first Bayesian acquisition function to narrow down the regions within the parameter space (e.g., optimize the parameter space) that are most likely to produce adverse events. In some examples, using results from previous scenario processing may reduce the number of simulations needed to optimize the parameter space.

In some examples, the systems and methods described herein determine a simulation scenario to process. A Bayesian acquisition function may determine a set of parameters that represent the simulation scenario. In some examples, the set of parameters may include a minimum value and a maximum value, which can define a range of values. Based on the set of parameters, the systems and methods may evaluate an autonomous vehicle simulator to determine a simulation result. In some examples, the systems and methods determine, based on the simulation result, at least one safety metric associated with an autonomous vehicle controller. In some examples, if the safety metric meets a particular safety threshold, the simulation scenario can be validated for use on a vehicle and may be used to control an autonomous vehicle, a vehicle controller, or other system.

Figures 3A, 3B, 3C:
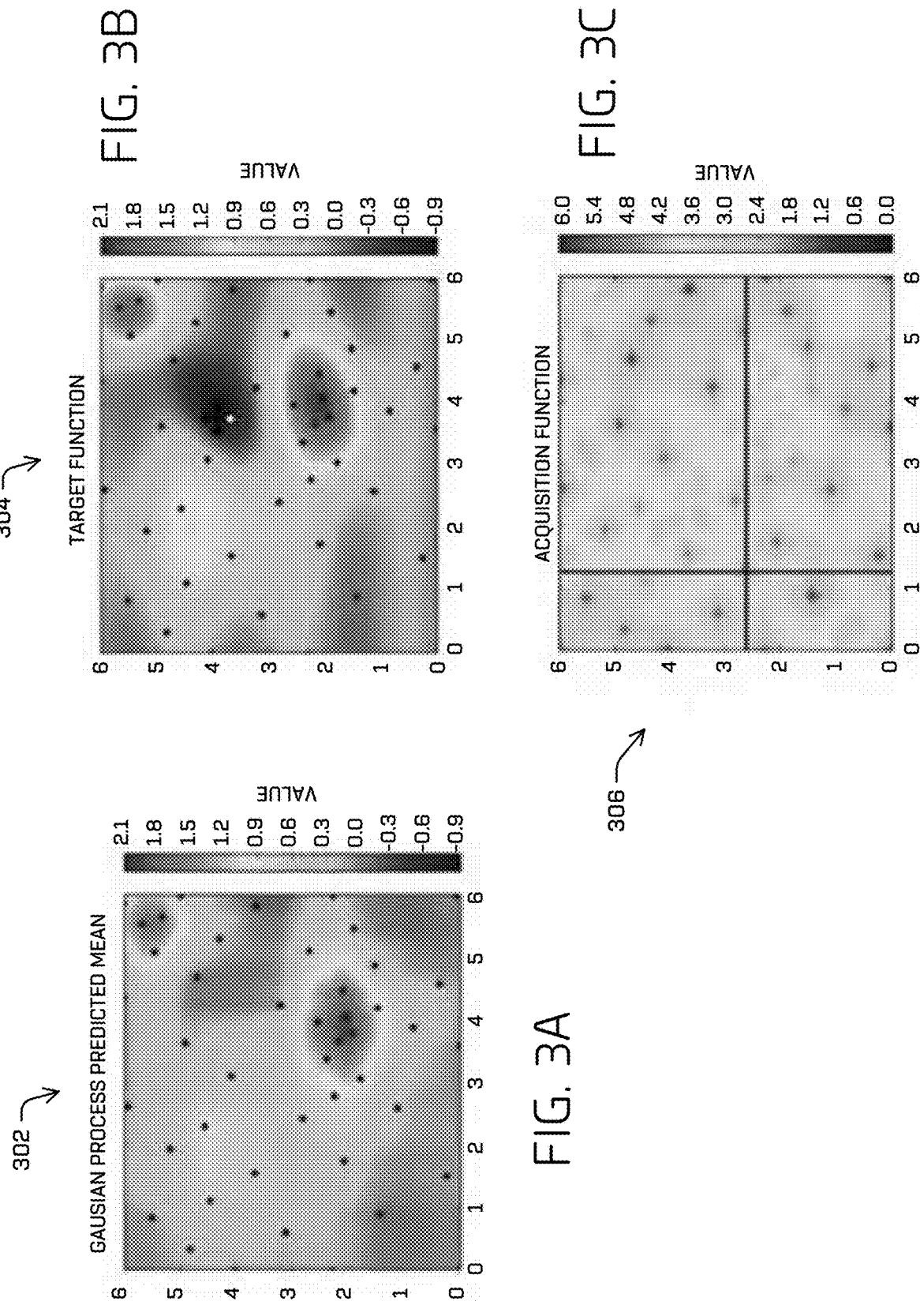
FIGS. 3A-3C illustrate example features associated with parameter spaces generated using Bayesian optimization techniques, in accordance with examples of the disclosure.

FIGS. 3A-3C illustrate example features associated with parameter spaces generated using Bayesian optimization techniques, in accordance with examples of the disclosure. For example, FIGS. 3A-3C show the iteration process to identify regions of interest in a two-dimensional Bayesian optimization process, as discussed herein. The axes of FIGS. 3A-3C may represent various parameters or factors, such as a vehicle speed, a vehicle distance from another vehicle or obstacle, and the like.

FIG. 3B illustrates a target function 304, such as the actual function being evaluated. FIG. 3A illustrates a Gaussian process predicted mean 302, which may be created based on each iteration to approximate the target function shown in FIG. 3B. FIG. 3C illustrates an example selection 306 of a next data point candidate to process (e.g., in the next iteration). The results of each iteration can be recorded in FIG. 3A. The results may be coded in FIG. 3A based on whether an adverse event was identified by the iteration. For example, the coding of the results may use different colors, different brightness, and the like to identify regions of interest where adverse events have been identified. In the example of FIGS. 3A and 3B, the darker portions of the image represent areas where adverse events have been identified. The lighter portions of FIGS. 3A and 3B represent areas where no adverse events have been identified. As an increasing number of iterations are performed, FIG. 3A may begin to look like FIG. 3B.

Figure 4:
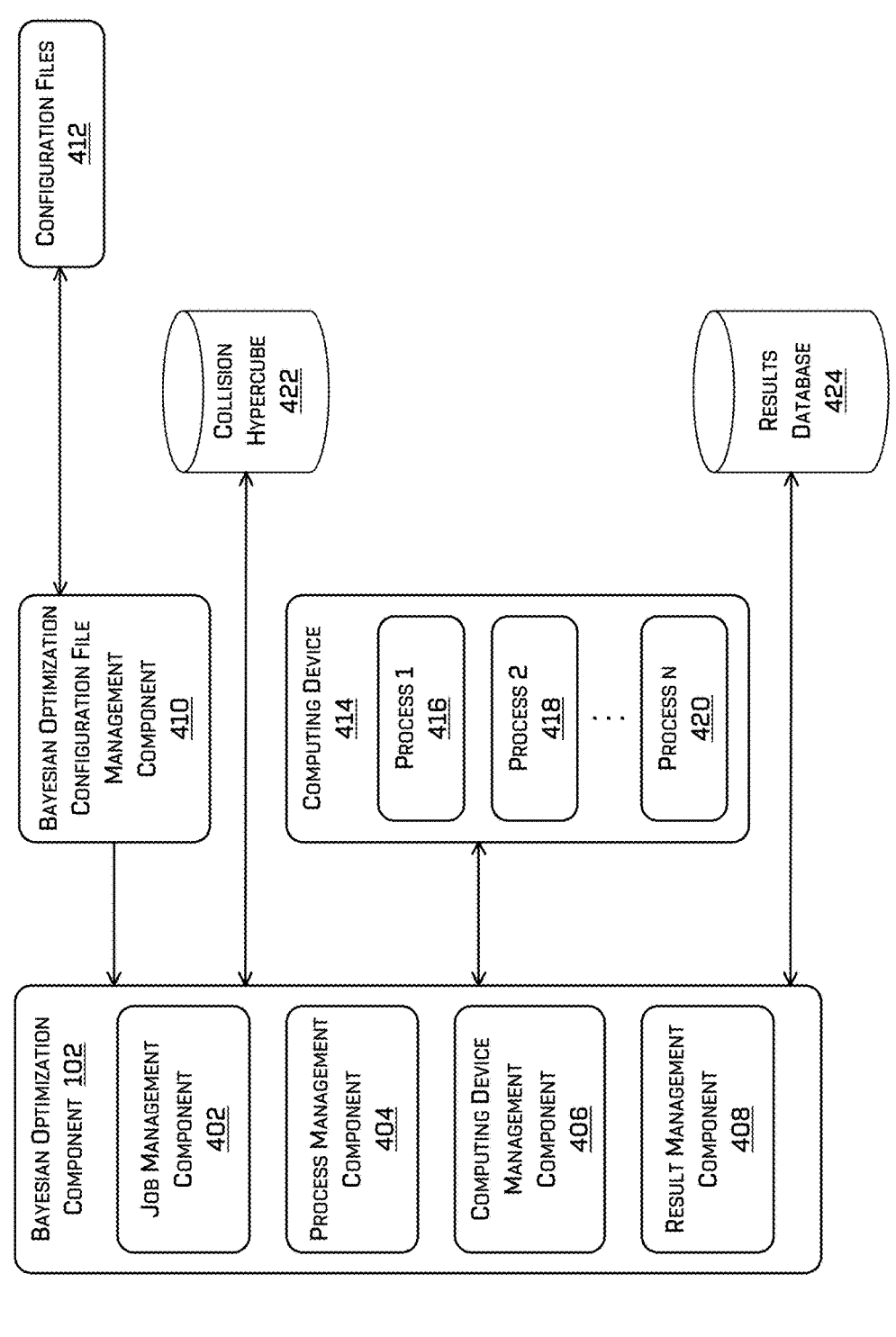
FIG. 4 is a schematic diagram illustrating an example implementation using Bayesian optimization to generate a parameter space using multiple processes and multiple computing devices in a compute cluster, in accordance with examples of the disclosure.

FIG. 4 is a schematic diagram illustrating an example implementation 400 using Bayesian optimization to generate a parameter space using multiple processes and multiple computing devices in a compute cluster, in accordance with examples of the disclosure.

As shown in FIG. 4, example implementation 400 may include the Bayesian optimization component 102 discussed above with respect to FIG. 1. The Bayesian optimization component 102 may include, for example, a job management component 402, a process management component 404, a computing device management component 406, and a result management component 408.

The job management component 402 may perform various functions to manage the execution of multiple jobs within example implementation 400, as discussed herein. The process management component 404 may perform one or more functions related to managing Bayesian optimization processes and the mapping of processes to specific computing devices. The computing device management component 406 handles the management of one or more computing devices that are executing one or more processes and associated jobs. The result management component 408 may perform functions related to storing and managing the various results generated by the jobs executed within the example implementation 400.

As shown in FIG. 4, a Bayesian optimization configuration file management component 410 can manage any number of configuration files 412 used by Bayesian optimization component 102. In some examples, each individual configuration file 412 may be associated with a particular process that implements a Bayesian optimization process using the individual configuration file 412. In some examples, each individual configuration file 412 may define a particular process or sequence for performing a Bayesian optimization.

Example implementation 400 includes one or more computing devices 414 that can each execute one or more processes 416, 418, and 420. A particular computing device 414 can execute any number of processes 416-420. Although one computing device 414 is shown in FIG. 4, example implementations may include any number of computing devices 414 coupled to Bayesian optimization component 102. Although Bayesian optimization component 102 is shown separately from the computing device 414, in some examples, Bayesian optimization component 102 is contained within the computing device 414.

In some examples, a Bayesian optimization process may be executed by Bayesian optimization component 102 using a local computing device, using computing device 414, or using both a local computing device and computing device 414.

In some examples, implementation 400 also includes a collision hypercube 422 and a results database 424. Collision hypercube 422 may be similar to the collision hypercube 112 discussed above with respect to FIG. 1. Results database 424 stores various results generated by the jobs executed within the example implementation 400.

FIG. 5 illustrates an example process 500 for executing multiple jobs on multiple computing devices to implement Bayesian optimization techniques, in accordance with examples of the disclosure. The operations described herein with respect to the process 500 may be performed by various components and systems, such as the components illustrated in FIGS. 1 and 4.

By way of example, the process 500 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 500. In some examples, multiple branches represent alternate implementations that may be used separately or in combination with other operations discussed herein.

At operation 502, the process may include determining a particular job to be executed. In some examples, multiple jobs may be executed (e.g., processed) to explore and optimize a parameter space. In some examples, a job may be associated with a particular scenario and may perform activities to optimize the particular scenario.

At operation 504, the process may include determining one or more Bayesian optimization configuration files associated with the job. In some examples, each job may have multiple associated Bayesian optimization configuration files that define, for example, parameters (and parameter ranges) to be used when executing the job. In some examples, each Bayesian optimization configuration file may identify a number of iterations to run with specific parameters.

At operation 506, the process may include determining one or more computing devices to execute the job. For example, a particular compute cluster may contain any number of computing devices (e.g., computing device 414 shown in FIG. 4) capable of implementing the jobs discussed herein.

At operation 508, the process may include determining multiple processes available to perform tasks associated with the job. In some examples, the multiple processes may be algorithms, components, and the like that are capable of performing one or more of the Bayesian optimization activities discussed herein. In some examples, each Bayesian optimization configuration file is mapped to a particular process.

At operation 510, the process may include assigning each of the multiple processes to a particular computing device. As shown in FIG. 4, multiple processes can be assigned to the same computing device.

At operation 512, the process may include receiving results from one or more of the multiple processes and storing the results in a results database (e.g., results database 424 shown in FIG. 4). In some examples, the results are stored in the results database along with the associated configuration file(s), initialization seeds (e.g., random seeds), and any other information associated with the operations performed by the processes.

At operation 514, the process may include determining whether there are additional jobs to execute. In some examples, multiple jobs may be executed to optimize a particular parameter space. If no jobs need to be executed, the process 500 may end at operation 516.

If additional jobs need to be executed, operation 518, the process may include determining a next job to execute. The process 500 returns to operation 504 to process the next job.

In some examples, an initial Bayesian optimization configuration file associated with a job may include the following initial parameter bounds:

Distance to pedestrian: 5-20
Pedestrian speed: 1-5
Autonomous vehicle speed: 1-5

These initial parameter bounds are executed by a job. In a particular example, the results of the job's execution may narrow the parameter space to:

Distance to pedestrian: 8-12

Pedestrian speed: 3-4

Autonomous vehicle speed: 1-5

In the above example, the parameter space has been narrowed, which indicates a smaller region within the parameter space where adverse events are likely to occur. With repeated execution of jobs that continue to implement the Bayesian optimization techniques discussed herein, the parameter space may be further narrowed. The continued narrowing of the parameter space may provide a smaller range of parameters that will produce a significant number of adverse events, thus saving time and computational resources as discussed herein.

In some examples, a particular job is executed after a Bayesian acquisition function generates an example scenario. The example scenario is communicated to a scenario translator, which returns a scenario file. The scenario file is communicated to a simulator, which returns a simulator result. A metric is calculated based on the simulator result. The Bayesian acquisition function is updated based on the metric. The process continues by implementing the next iteration based on the updated Bayesian acquisition function.

In some examples, the systems and methods described herein may define one or more regions (e.g., parameter spaces) and any entities (e.g., objects) present in each region. For any entities present in a region, the systems and methods may define each entity based, for example, on the entity's parameters, behaviors, and the like. For example, a vehicle may have associated information including a vehicle velocity, a vehicle's distance to an intersection, an intersection type, and a maneuver type.

As discussed herein, a Bayesian configuration file may include parameters associated with a parameter space. In some examples, these parameters may have an allowable range of values and, in some cases, an allowable range of types. For example, a parameter's range of values may be defined using a minimum value and a maximum value.

In some examples, the Bayesian optimization process can be optimize based on various metrics, such as vehicle separation distances, minimum distance between a vehicle and an object, time to collision, and post-encroachment time. In some examples, the metric selected for optimization may vary depending on the scenario.

Figure 6:
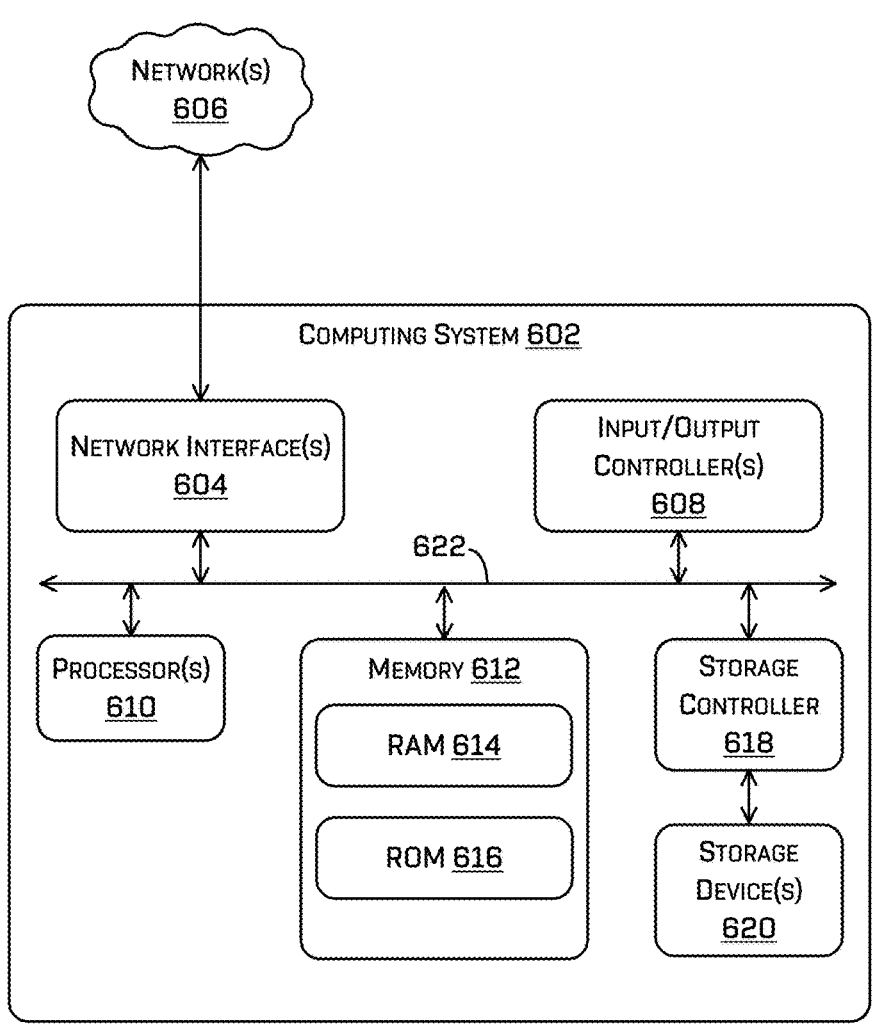
FIG. 6 illustrates a block diagram of an example computing system that is capable of implementing the functionality described herein.

FIG. 6 illustrates a block diagram of an example computing system 602 that is capable of implementing the functionality described herein. Computing system 602 may include a server, workstation, desktop computer, laptop computer, tablet, smartphone, and the like. For example, computing system 602 may implement computing device 414, Bayesian optimization component 102, and any other components or systems discussed herein.

In some examples, the computing system 602 can operate in a networked environment using connections to remote computing devices and other systems through one or more networks, such as network(s) 606. The computing system 602 may support network connectivity through one or more network interface(s) 604. In some examples, the network interface(s) 604 can connect the computing system 602 with other systems and devices via network(s) 606.

In some examples, the computing system 602 may include one or more input/output controller(s) 608 for sending and receiving data associated with a variety of devices.

For example, the input/output controller(s) 608 may receive data with a keyboard, a mouse, a touchpad, a touch screen, an electronic stylus, or any other type of input device. Similarly, the input/output controller(s) 608 may provide output to a display, such as a computer monitor, a flat-panel display, a digital projector, a printer, or any other type of output device. It will be appreciated that the computing system 602 may not include all of the components shown in FIG. 6, may include additional components not shown in FIG. 6, or may use an architecture that is different from the architecture shown in FIG. 6.

In some examples, one or more processor(s) 610 may perform various functions, such as arithmetic operations, logical operations, and the like. By way of example and not limitation, the processor(s) 610 may include one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

As shown in FIG. 6, a memory 612 may include a RAM (random access memory) 614 and a ROM (read-only memory) 616. In some examples, memory 612 may include one or more other types of memory devices. Memory 612 may store any type of data and other information, such as the data, algorithms, and other information used by the systems and methods described herein.

In some examples, the memory 612 may be an example of non-transitory computer-readable media. For example, the memory 612 may store an operating system and one or more software applications, instructions, programs, and/or data to implement the methods described herein and the functions attributed to the various systems.

In some examples, the computing system 602 may include a storage controller 618 that is coupled to one or more storage device(s) 620. In some examples, at least a portion of the storage device(s) 620 may provide non-volatile storage for the computing system 602. For example, the storage device(s) 620 may store an operating system, programs, data, algorithms, simulation information, and the like. The storage device(s) 620 may include any number of physical storage devices, such as hard disk drives, solid state drives, flash drives, magnetic drives, and the like.

The storage controller 618 can interface with the storage device(s) 620 through a serial attached SCSI ("SAS") interface, a serial advanced technology attachment ("SATA") interface, a fiber channel ("FC") interface, or any other type of interface that supports the transfer of data between computing systems and physical storage devices.

As shown in FIG. 6, computing system 602 may include a bus 622 that allows various components and devices to communicate with one another. For example, network interface(s) 604, input/output controller(s) 608, processor(s) 610, memory 612, and storage controller 618 may communicate with one another via the bus 622.

In addition to the storage device(s) 620 described herein, the computing system 602 can have access to other computer-readable storage media to store and retrieve information, such as program modules, data structures, or other data. Those skilled in the art should appreciate that computer-readable storage media is any available media that provides for the non-transitory storage of data and that can be accessed by the computing system 602. In some examples, the methods and operations discussed herein may be supported by one or more devices similar to computing system 602.

In some examples, computer-readable storage media may include volatile and non-volatile, removable and non-removable media implemented using any method or technology. For example, computer-readable storage media may include RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may store the desired information in a non-transitory fashion.

Example Clauses

A. A system comprising: one or more processors; and one or more non-transitory computer-readable media storing instructions executable by the one or more processors, wherein the instructions, when executed, cause the system to perform operations comprising: receiving policy data for evaluating a vehicle controller; determining, using a Bayesian optimization and based at least in part on the vehicle controller, parameter sets associated with adverse events, wherein the adverse events are associated with a violation of the policy data; associating, based on exposure data, parameter bounds of the adverse events and probabilities of the adverse events in a driving environment; determining a safety metric; weighting an impact of an adverse event based on the safety metric; and determining whether the safety metric exceeds a threshold value for use in an autonomous vehicle.

B. The system of paragraph A, wherein the exposure data includes data captured by at least one vehicle during driving activities.

C. The system of paragraph A or B, wherein associating parameter bounds of the adverse events and probabilities of the adverse events is performed using a Gaussian mixture model.

D. The system of any of paragraphs A-C, wherein the Bayesian optimization uses a first acquisition function, the operations further comprising: iteratively evaluating the vehicle controller using the first acquisition function; and based at least in part on a result of the first acquisition function, executing the vehicle controller using a second acquisition function; wherein the first acquisition function is associated with exploring a parameter space and the second acquisition function is associated with optimizing simulations within the parameter space that are associated with low frequency adverse events.

E. The system of any of paragraphs A-D, wherein an adverse event includes an event in which executing the vehicle controller results in a violation of the policy data.

F. The system of any of paragraphs A-E, wherein the policy data comprises one or more of: a requirement to maintain a minimum distance between the vehicle and another object; a requirement to stay below a maximum speed; a requirement to identify all objects in the driving environment; and a requirement to stay within a driving lane.

G. A method comprising: receiving policy data for evaluating a vehicle controller; determining, using a Bayesian optimization and based at least in part on the vehicle controller, parameter sets associated with adverse events, wherein the adverse events are associated with a violation of the policy data; associating, based on exposure data, parameter bounds of the adverse events and probabilities of the adverse events in a driving environment; determining a safety metric based on the Bayesian optimization; and weighting an impact of an adverse event based on the safety metric.

H. The method of paragraph G, wherein determining parameter sets associated with adverse events includes: determining results of previous Bayesian optimizations; and determining, based on the results of previous Bayesian optimizations, low frequency and high criticality events using a first Bayesian acquisition function.

I. The method of paragraph G or H, wherein parameters in the parameter sets comprise one or more of: a number of objects in an environment; a type of an object in an environment; a type of intersection; a vehicle speed; a distance from the vehicle to an additional object; and a speed of the additional object.

J. The method of any of paragraphs G-I, wherein the exposure data includes data captured by at least one vehicle during driving activities.

K. The method of any of paragraphs G-J, further comprising: determining whether the safety metric exceeds a threshold value for use in an autonomous vehicle.

L. The method of paragraph G-K, further comprising: validating the Bayesian optimization for use in an autonomous vehicle controller responsive to determining that the safety metric exceeds the threshold value.

M. The method of any of paragraphs G-L, wherein associating parameter bounds of the adverse events and probabilities of the adverse events is performed using a Gaussian mixture model.

N. The method of any of paragraphs G-M, wherein the Bayesian optimization uses a first acquisition function, the operations further comprising: iteratively evaluating the vehicle controller using the first acquisition function; and based at least in part on a result of the first acquisition function, executing the vehicle controller using a second acquisition function; wherein the first acquisition function is associated with exploring a parameter space and the second acquisition function is associated with optimizing simulations within the parameter space that are associated with low frequency adverse events.

O. The method of any of paragraphs G-N, wherein an adverse event includes an event in which executing the vehicle controller results in a violation of the policy data.

P. The method of any of paragraphs G-O, wherein the policy data comprises one or more of: a requirement to maintain a minimum distance between the vehicle and another object; a requirement to stay below a maximum speed; a requirement to identify all objects in the driving environment; and a requirement to stay within a driving lane.

Q. One or more non-transitory computer-readable media storing instructions that, when executed, cause one or more processors to perform operations comprising: receiving policy data for evaluating a vehicle controller; determining, using a Bayesian optimization and based at least in part on the vehicle controller, parameter sets associated with adverse events, wherein the adverse events are associated with a violation of the policy data; associating, based on exposure data, parameter bounds of the adverse events and probabilities of the adverse events in a driving environment; determining a safety metric based on the Bayesian optimization; and weighting an impact of an adverse event based on the safety metric.

R. The one or more non-transitory computer-readable media of paragraph Q, wherein determining parameter sets associated with adverse events includes: determining results of previous Bayesian optimizations; and determining, based on the results of previous Bayesian optimizations, low frequency and high criticality events using a first Bayesian acquisition function.

S. The one or more non-transitory computer-readable media of paragraph Q or R, wherein the operations further comprise: validating the Bayesian optimization for use in an autonomous vehicle controller responsive to determining that the safety metric exceeds a threshold value.

T. The one or more non-transitory computer-readable media of any of paragraphs Q-S, wherein associating parameter bounds of the adverse events and probabilities of the adverse events is performed using a Gaussian mixture model.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving policy data for evaluating a vehicle controller;
determining, using a Bayesian optimization and based at least in part on the vehicle controller, parameter sets associated with adverse events, wherein the adverse events are associated with a violation of the policy data, wherein parameters in the parameter sets represent conditions of the vehicle controller and an object in a simulated environment, determined using the Bayesian optimization and based on the vehicle controller, resulting in an increased likelihood of a simulation resulting in the adverse events between the vehicle controller and the object;
associating, based on exposure data, bounds of the parameters of the parameters sets of the adverse events and probabilities of the adverse events in a driving environment, wherein the bounds of the parameters in the parameter sets include a minimum value and a maximum value of a distance, a velocity, or an acceleration;
determining a ratio between first results associated with first parameter value ranges indicating an adverse event occurred and second results associated with second parameter value ranges indicating a lack of the adverse event;
determining a safety metric based on the Bayesian optimization and the ratio; and
assigning a safety metric value to the adverse event.

2. The method of claim 1, wherein determining parameter sets associated with adverse events includes:
determining results of previous Bayesian optimizations; and
determining, based on the results of previous Bayesian optimizations, low frequency adverse events using a first Bayesian acquisition function.

3. The method of claim 1, wherein the parameters are first parameters, and wherein second parameters in the parameter sets comprise one or more of:
a number of objects in an environment;
a type of an object in an environment;
a type of intersection;
a vehicle speed;
a distance from a vehicle represented by the vehicle controller to an additional object; and
a speed of the additional object.

4. The method of claim 1, wherein the exposure data includes data captured by at least one vehicle during driving activities.

5. The method of claim 1, further comprising:
determining whether the safety metric exceeds a threshold value for use in an autonomous vehicle.

6. The method of claim 5, further comprising:
validating the Bayesian optimization for use in an autonomous vehicle controller responsive to determining that the safety metric exceeds the threshold value.

7. The method of claim 1, wherein associating the bounds of the parameters of the parameters sets of the adverse events and probabilities of the adverse events is performed using a Gaussian mixture model.

8. The method of claim 1, wherein the Bayesian optimization uses a first acquisition function, the method further comprising:
iteratively evaluating the vehicle controller using the first acquisition function; and
based at least in part on a result of the first acquisition function, executing the vehicle controller using a second acquisition function;
wherein the first acquisition function is associated with exploring a parameter space and the second acquisition function is associated with optimizing simulations within the parameter space that are associated with low frequency adverse events.

9. The method of claim 1, wherein an adverse event of the adverse events includes an event in which executing the vehicle controller results in a violation of the policy data.

10. The method of claim 1, wherein the policy data comprises one or more of:
a requirement to maintain a minimum distance between a vehicle representing the vehicle controller and another object;
a requirement to stay below a maximum speed;
a requirement to identify all objects in the driving environment; and
a requirement to stay within a driving lane.

11. A system comprising:

one or more processors; and one or more non-transitory computer-readable media storing instructions executable by the one or more processors, wherein the instructions, when executed, cause the system to perform operations comprising:

receiving policy data for evaluating a vehicle controller;

determining, using a Bayesian optimization and based at least in part on the vehicle controller, parameter sets associated with adverse events, wherein the adverse events are associated with a violation of the policy data, wherein parameters in the parameter sets represent conditions of the vehicle controller and an object in a simulated environment, determined using the Bayesian optimization and based on the vehicle controller, resulting in an increased likelihood of a simulation resulting in the adverse events between the vehicle controller and the object;

associating, based on exposure data, bounds of the parameters in the parameter sets of the adverse events and probabilities of the adverse events in a driving environment, wherein the bounds of parameters in the parameter sets include a minimum value and a maximum value of a distance, a velocity, or an acceleration;

determining a ratio between first results associated with first parameter value ranges indicating an adverse event occurred and second results associated with second parameter value ranges indicating a lack of the adverse event;

determining, based at least in part on the ratio, a safety metric;

assigning a safety metric value to the adverse event; and determining whether the safety metric exceeds a threshold value for use in an autonomous vehicle.

12. The system of claim 11, wherein the exposure data includes data captured by at least one vehicle during driving activities.

13. The system of claim 11, wherein associating the bounds of the parameters in the parameter sets of the adverse events and probabilities of the adverse events is performed using a Gaussian mixture model.

14. The system of claim 11, wherein the Bayesian optimization uses a first acquisition function, the operations further comprising:

iteratively evaluating the vehicle controller using the first acquisition function; and based at least in part on a result of the first acquisition function, executing the vehicle controller using a second acquisition function;

wherein the first acquisition function is associated with exploring a parameter space and the second acquisition function is associated with optimizing simulations within the parameter space that are associated with low frequency adverse events.

15. The system of claim 11, wherein the adverse event includes an event in which executing the vehicle controller results in a violation of the policy data.

16. The system of claim 11, wherein the policy data comprises one or more of:

a requirement to maintain a minimum distance between the autonomous vehicle and another object;

a requirement to stay below a maximum speed;

a requirement to identify all objects in the driving environment; and a requirement to stay within a driving lane.

17. One or more non-transitory computer-readable media storing instructions that, when executed, cause one or more processors to perform operations comprising:

receiving policy data for evaluating a vehicle controller;

determining, using a Bayesian optimization and based at least in part on the vehicle controller, parameter sets associated with adverse events, wherein the adverse events are associated with a violation of the policy data, wherein parameters in the parameter sets represent conditions of the vehicle controller and an object in a simulated environment, determined using the Bayesian optimization and based on the vehicle controller, resulting in an increased likelihood of a simulation resulting in the adverse events between the vehicle controller and the object;

associating, based on exposure data, bounds of the parameters in the parameter sets of the adverse events and probabilities of the adverse events in a driving environment, wherein the bounds of the parameters in the parameter sets include a minimum value and a maximum value of a distance, a velocity, and an acceleration;

determining a ratio between first results associated with first parameter value ranges indicating an adverse event occurred and second results associated with second parameter value ranges indicating a lack of the adverse event;

determining a safety metric based on the Bayesian optimization and the ratio; and assigning a safety metric value to the adverse event.

18. The one or more non-transitory computer-readable media of claim 17, wherein determining parameter sets associated with adverse events includes:

determining results of previous Bayesian optimizations; and determining, based on the results of previous Bayesian optimizations, low frequency adverse events using a first Bayesian acquisition function.

19. The one or more non-transitory computer-readable media of claim 17, wherein the operations further comprise:

validating the Bayesian optimization for use in an autonomous vehicle controller responsive to determining that the safety metric exceeds a threshold value.

20. The one or more non-transitory computer-readable media of claim 17, wherein associating the bounds of the parameters in the parameter sets of the adverse events and probabilities of the adverse events is performed using a Gaussian mixture model.

* * * * *